United States Patent
Black et al.

(10) Patent No.: US 6,327,532 B1
(45) Date of Patent: Dec. 4, 2001

(54) NAVIGATION METHOD AND NAVIGATION APPARATUS FOR A VEHICLE

(75) Inventors: Karl-Heinz Black, Hildesheim; Walter Fricke, Salzdetfurth; Peter Heidekrueger, Hildesheim, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/417,440

(22) Filed: Oct. 13, 1999

(30) Foreign Application Priority Data

Oct. 16, 1998 (DE) .............................................. 198 47 754

(51) Int. Cl.⁷ .................................................... G01C 21/00
(52) U.S. Cl. ........................... 701/200; 701/206; 701/208
(58) Field of Search ..................................... 701/200, 201, 701/202, 207, 206, 208, 209, 210, 211; 340/988, 990, 995; 73/178 R

(56) References Cited

U.S. PATENT DOCUMENTS

| | | | |
|---|---|---|---|
| 4,954,958 | * | 9/1990 | Savage et al. ....................... 340/995 |
| 5,103,400 | * | 4/1992 | Yamada et al. ....................... 340/995 |
| 5,231,584 | * | 7/1993 | Nimura et al. ....................... 340/995 |
| 5,353,034 | * | 10/1994 | Sato et al. ............................ 701/200 |
| 5,635,953 | | 6/1997 | Hayami et al. . |
| 5,765,123 | | 6/1998 | Nimura et al. . |
| 6,049,755 | * | 4/2000 | Lou et al. ............................. 701/208 |
| 6,055,478 | * | 4/2000 | Heron .................................. 701/208 |

FOREIGN PATENT DOCUMENTS

359015815 * 1/1984 (JP) ..................................... 701/208

* cited by examiner

Primary Examiner—Richard M. Camby
(74) Attorney, Agent, or Firm—Michael J. Striker

(57) ABSTRACT

The present invention includes a navigation process and a navigation system for a vehicle, especially a motor vehicle, a ship or aircraft, for navigating the vehicle from a starting position to a destination, in which a predetermined destination and, if necessary, a starting position are input into the navigation system. In this navigating method one or more predetermined numbers designating the predetermined destination and, if necessary, the starting position are input to the navigation system; then the one or more numbers are correlated with one or more position addresses from a position address list provided in a memory device and are read out from the memory device; and the one or more position addresses output from the memory device are assigned as the destination and, if necessary, the starting position. Preferably the numbers input to the memory device are telephone numbers of telephones located at the different destinations and the memory device includes a CD-ROM.

6 Claims, 3 Drawing Sheets

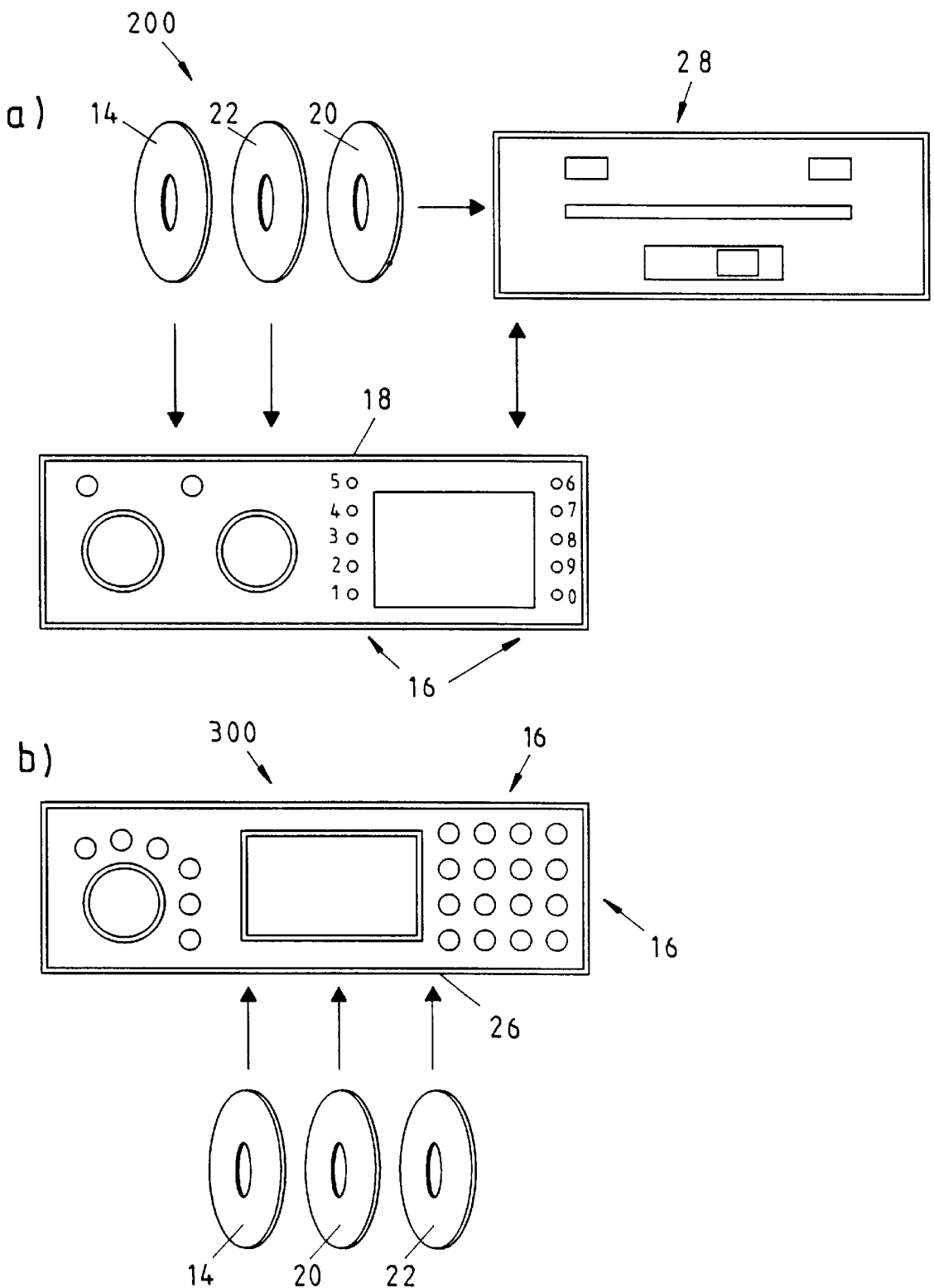

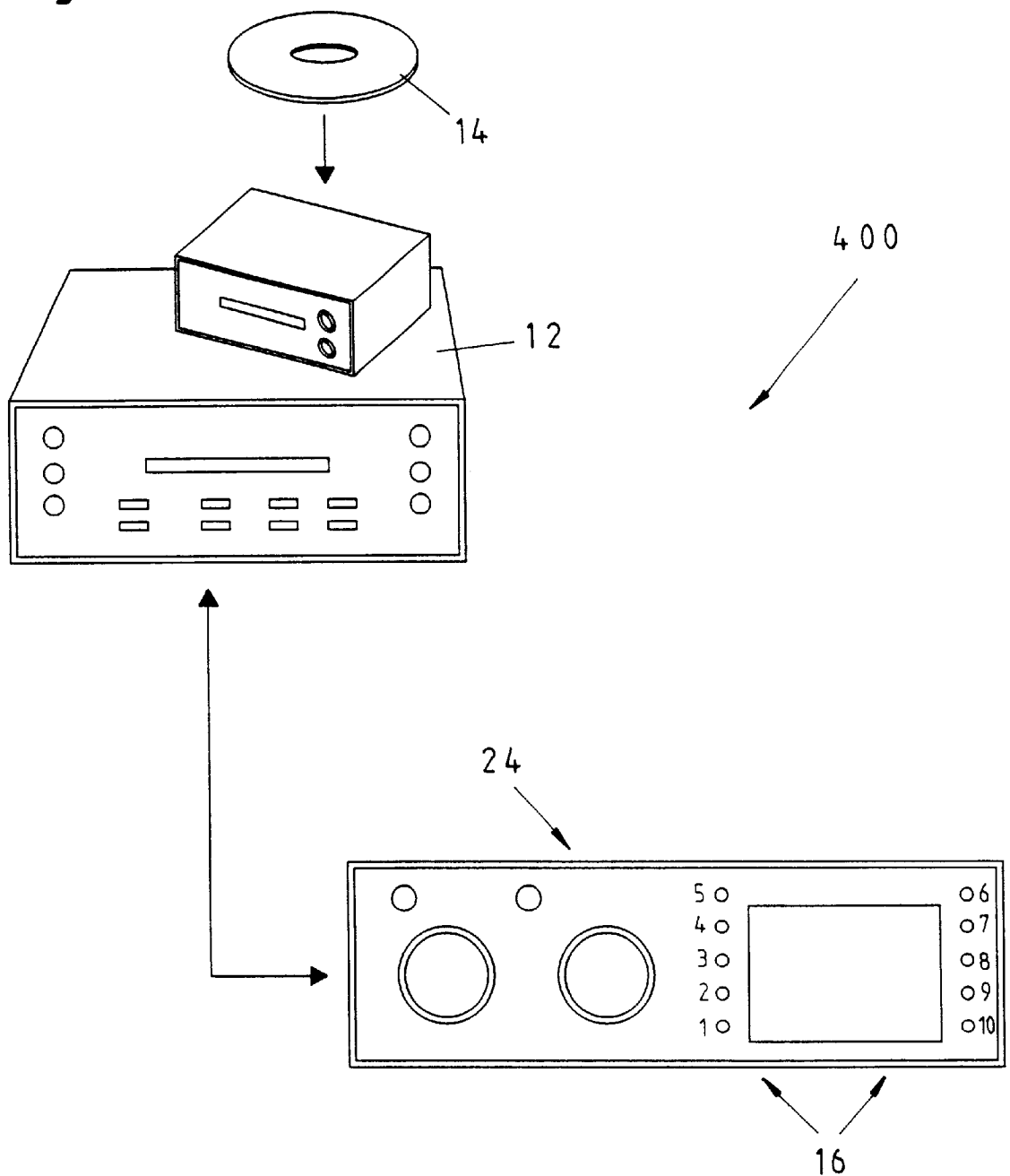

NAVIGATION METHOD AND NAVIGATION APPARATUS FOR A VEHICLE

BACKGROUND OF THE INVENTION

1. Field of the Invention

The present invention relates to a method of navigating a means of conveyance or vehicle, especially a self-powered vehicle, a ship or an aircraft, from a starting position to a destination, wherein the destination and, if necessary, the starting location are input to the navigation system. The invention also relates to a navigation system for the vehicle, especially a self-powered vehicle, ship or aircraft, for navigating from a starting position to a destination, in which an input device for input of the destination and, if necessary, the starting position is provided.

2. Prior Art

In a vehicle, especially a motor vehicle, aircraft or ship, fixed or installed navigation systems rapidly guide an operator of the vehicle, simply and reliably from an actual starting position to a desired destination, without requiring the operator to obtain a map and perform the work of planning a route. Suitable navigation data is present, for example stored on a CD-ROM, based e.g. on data from a map, chart or street map. The navigation unit determines the momentary location of the vehicle, e.g. for example using a GPS (Global Positioning System), and calculates suitable navigation statements or instructions, which guide the vehicle to a predetermined destination. For example, the navigation data includes data regarding streets and roads for a motor vehicle.

However before the navigation system performs its function and can calculate a route from a starting location to a destination, it is necessary to input the desired destination and, if necessary, also the actual starting location into the navigation system without a GPS. This occurs for example by a manually operated input device, in which the alphabetic characters of a character table are scrolled or called up in succession and are selected, until the selected characters and numbers designate the appropriate destination or starting point, for example a street name and house number of the destination or starting point. This however is troublesome and time-consuming and requires a certain fundamental knowledge of the operational details of the navigation system.

SUMMARY OF THE INVENTION

It is an object of the present invention to provide an improved navigation method and navigation system of the above-described kind, which eliminates the above-described disadvantage and is simpler and more comfortable to operate.

This object, and others which will be made more apparent hereinafter, is attained in a method of navigating a means of conveyance or vehicle, especially a self-powered vehicle, a ship or an aircraft, from a starting position to a destination, wherein the destination and, if necessary, the starting location are input to the navigation system.

According to the invention the method of navigating a vehicle comprises the steps of:

a) inputing one or more predetermined numbers designating the predetermined destination and, if necessary, the starting position into the navigation system;

b) correlating the one or more predetermined numbers with at least one position address from a position address list provided in a memory device and reading out the at least one position address from the memory device; and c) assigning the at least one position address output from the memory device in step b) as the predetermined destination and, if necessary, starting position in the navigation system.

The method according to the invention has the advantage that complete destination data can be provide to the navigation system by the input of a simple number, i.e. with only e.g. ten different keys of a numerical ten-key key pad or input device, without the need of successively entering troublesome alphabetic character information for retrieval of destination information from an alphabetic character table, including place name, street name and house number.

Furthermore preferred features are described and claimed in appended dependent method claims.

In a preferred embodiment the numbers are telephone numbers of telephones at various possible destinations or starting locations and in the method according to the invention input of a particular telephone number to the navigation system results in retrieval of the position address correlated with it from the memory device and that position address is assigned as the destination or starting position.

Preferably the memory device contains a direct correlation of the position addresses to the numbers and advantageously comprises a CD-ROM.

Appropriately the input device is an external ten-key input device or is a numeric input device of an auto radio or CD player connected to the navigation system.

The navigation system according to the invention comprises a numeric keyboard device for input of numbers and a memory device containing a list of position addresses for the different destinations and starting locations correlated with the numbers or which can be correlated with the numbers.

This has the advantage that a simple input of destination or starting location data to the navigation system is possible, by only inputting numbers without troublesome alphabetic character selection from a character table. This data can be completely provided simply by input of numbers, i.e. with only a ten digit numeric key pad or keyboard device, without inputting the destination data in the troublesome form of location names, street names and house numbers comprising numbers for numeric characters and alphabetic symbols for alphabetic characters.

Preferred embodiments of the navigation system are described and claimed in appended dependent claims.

Appropriately the numeric key pad or keyboard input device is an external ten-key input device or a numeric input device of an auto radio or CD player connected with the navigation system.

An especially simple and intuitive access to the data of the memory is obtained when the numbers are telephone numbers.

In a particularly preferred embodiment the memory device is a CD-ROM and the numbers are telephone numbers of a telephone number list stored on the CD-ROM which are correlated with position addresses stored on the CD-ROM.

BRIEF DESCRIPTION OF THE DRAWING

The objects, features and advantages of the invention will now be illustrated in more detail with the aid of the following description of the preferred embodiments, with reference to the accompanying figures in which:

FIG. 2a) is a schematic, partially perspective, view of a second preferred embodiment of a navigation system according to the invention;

FIG. 2b) is a schematic, partially perspective, view of a third preferred embodiment of a navigation system according to the invention; and FIG. 3 is a schematic, partially perspective, view of a fourth preferred embodiment-of a navigation system according to the invention.

DESCRIPTION OF THE PREFERRED EMBODIMENTS

Figure 1:
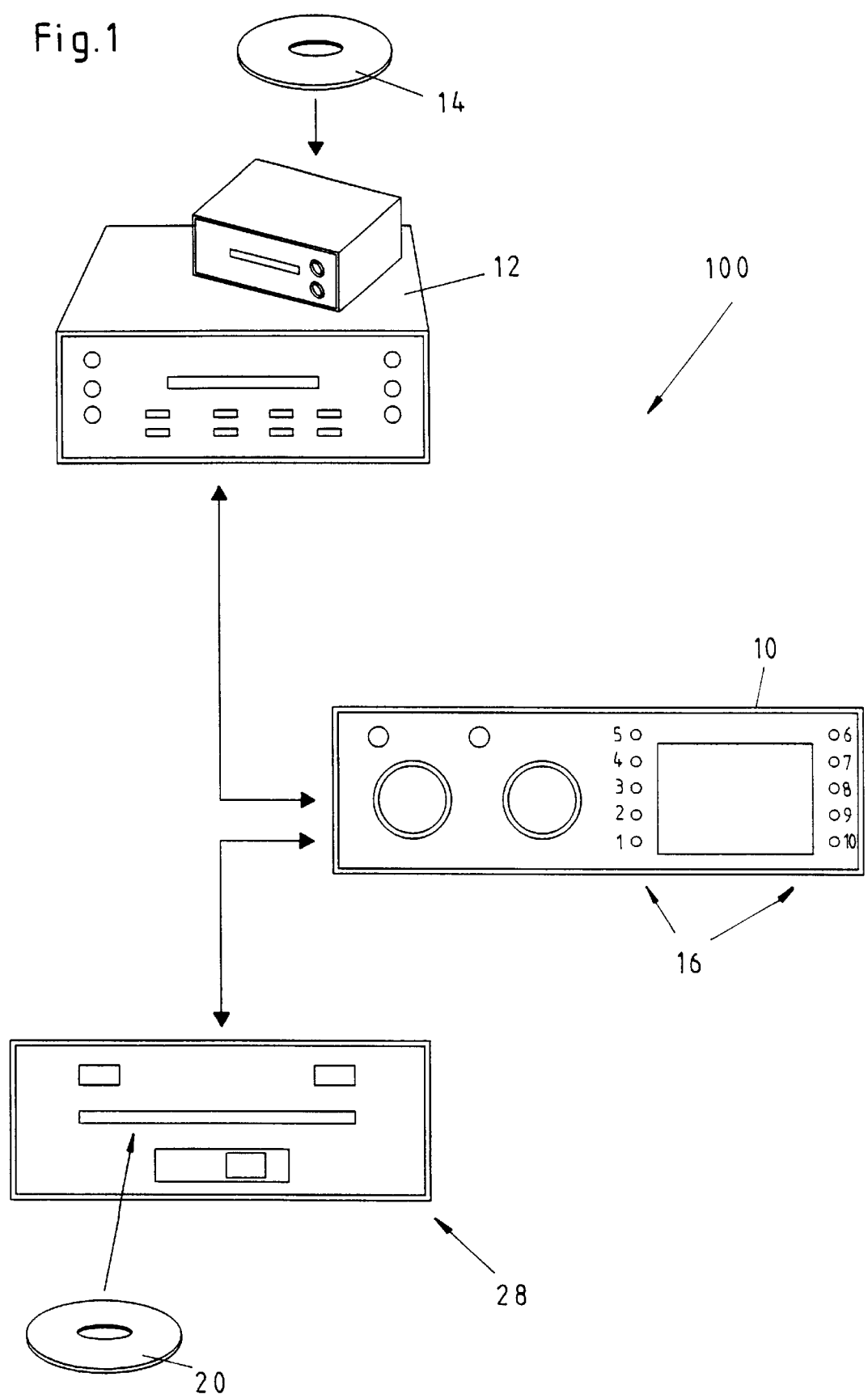
FIG. 1 is a schematic, partially perspective, view of a first preferred embodiment of a navigation system according to the invention.

The first preferred embodiment of the navigation system 100 according to the invention shown in FIG. 1 includes an auto radio 10, which includes means for controlling an external navigation system 28, and a CD changer 12 connected with the auto radio 10. A navigation CD is present in an unshown CD operating mechanism of the external navigation unit 28. A CD-ROM 14 containing a telephone number list is provided in a fixed or assigned place in the CD changer 12 as an additional memory or memory device. The auto radio 10 includes a ten-key input device 16, by means of which the telephone number of a telephone, for example at a predetermined destination, can be entered. The external navigation unit 28 reads a position address correlated with the input telephone number from the CD-ROM 14 containing the telephone number list and converts it to destination data for subsequent route calculations by means of the information stored on a navigation CD 20.

The second preferred embodiment of the navigation system 200 shown in FIG. 2a includes an auto radio 18 with an internal CD operating mechanism instead of the external CD changer 12 according to the first embodiment 100, in which alternatively an audio CD-ROM 22 or the CD-ROM 14 containing the telephone list is inserted. The CD operating mechanism of the auto radio 18 is appropriately equipped with an unshown automatic CD changer. A ten-key input device 16 is provided in the auto radio 18 for input of a telephone number.

The third preferred embodiment of the navigation system 300 according to the invention shown in FIG. 2b) corresponds to the second embodiment 200 of FIG. 2a) but differs from it in that an auto radio 26 with integrated navigation system is provided so that the external navigation unit 28 is eliminated in contrast to the second embodiment shown in FIG. 2a).

The fourth preferred embodiment of the navigation system 400 according to the invention shown in FIG. 3 corresponds to the embodiment 100 of FIG. 1, but differs in that an auto radio 24 with integrated navigation system is provided so that in contrast to the embodiment 100 shown in FIG. 1 the external navigation unit 28 is eliminated.

A detailed explanation of the navigation process according to the invention follows which is the same and equally applicable for all embodiments. A commercial telephone-CD may be used for the CD-ROM 14 containing the list of telephone numbers. However instead of this CD an additional memory may be provided which contains a correlations of numbers to position addresses. In this case it is not necessary to input the telephone numbers. An operator selects a desired destination or starting location from a hard copy list available to him and inputs a number in that list designating the desired position. These sort of numbers can be printed for example on a special map or chart provided for that purpose.

In the following a navigation method according to the invention based on only the input of telephone numbers and use of a telephone-list-CD-ROM is described. Commercial telephone-CD's are known to already contain a correlation of respective position addresses with the telephone numbers. According to the invention this sort of telephone list is integrated into the destination and/or starting position entry device for the navigation system according to the invention, so that a destination and/or starting position can be entered or input by means of the input of a telephone number of a telephone at the desired position. The required position data, such as position name, street name and house number, are completely available from the telephone number list and may be found in the additional memory or memory device in the form of a telephone-list-CD-ROM with the aid of an input telephone number. These location data retrieved as destination positions and/or starting location positions by the navigation system after input of the appropriate telephone number. A simple ten-key input device 16 or a numeric input device of a unit integrated into the navigation system, for example an auto radio or CD-player, is completely sufficient for destination or starting position input.

The navigation processor calls for the position address associated with the input telephone number from the telephone-CD after input of the telephone number by the operator, for example by means of the ten-key input device 16, and retrieves the complete position address which is simultaneously displayed on a display unit. After confirmation by the operator the position address is used as the destination position address or the starting position address.

The required CD-ROM containing the telephone list for the method according to the invention is, for example, associated with a fixed or assigned place in the CD changer. The required data are called for as needed by the navigation processor. For example the CD operating mechanism of the navigation system is equipped with an automatic CD changer, whereby access is obtained to either data on the CD-ROM 14 with the telephone list or navigation data on the CD-ROM 20.

The disclosure in German Patent Application 198 47 754.6-32 of Oct. 6, 1998 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in a navigation method and navigation apparatus for a vehicle, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. A navigation system for navigation of a vehicle to a selected destination from a starting position, said navigation system comprising means for inputting the selected destination into the navigation system, said means for inputting comprising a ten-key key-operated device for input of respective telephone numbers for telephones at predetermined locations; and a memory device (14) including means for storing said telephone numbers together with corresponding position addresses for said predetermined locations, wherein said ten-key key-operated device (16) is arranged in an auto radio or a CD player;

whereby input of a selected one of said telephone numbers by means of said ten-key key-operated device (16) retrieves the corresponding one of the position addresses from said memory device as the selected destination for navigation of the vehicle.

2. The navigation system as defined in claim 1, wherein said memory device (14) is a CD-ROM.

3. The navigation system as defined in claim 1, further comprising means for retrieving said corresponding one of said position addresses on input of said selected one of said telephone numbers.

4. The navigation system as defined in claim 1, further comprising said auto radio and wherein said ten-key key-operated device (16) is part of said auto radio.

5. The navigation system as defined in claim 4 wherein said auto radio includes a CD playback device and a CD-ROM and said memory device (14) comprises said CD-ROM.

6. The navigation system as defined in claim 1, wherein said vehicle is a motor vehicle or an aircraft.

* * * * *